United States Patent Office 3,325,449
Patented June 13, 1967

3,325,449
ORGANOPOLYSILOXANE COMPOUNDS AND COMPOSITIONS
Louis F. Ceyzeriat and Georges L. Pagni, Lyon, France, assignors to Rhone-Poulenc S.A., Paris, France, a French body corporate
No Drawing. Filed Mar. 21, 1963, Ser. No. 266,829
Claims priority, application France, Mar. 21, 1962, 891,774
11 Claims. (Cl. 260—46.5)

The present invention relates to new organopolysiloxane compounds which are stable in storage and can be converted into elastic solids, and to compositions containing the new compounds.

A number of means of preparing elastic solids based upon organopolysiloxanes are already known, and various organopolysiloxane compositions which are more or less ready for immediate use have been proposed for various applications requiring the formation of an elastic solid. Some of these compositions are offered to the consumer in two packages, one package containing an organopolysiloxane, generally a hydroxyl-containing diorganopolysiloxane and, if desired, a crosslinking agent such as an alkyl silicate or a polysilicate, a siloxane containing SiH radicals, or esterified silicic fillers, and the other package containing a catalyst (metallic derivative, amine, etc.) mixed, if desired, with all or part of the crosslinking agent. However, such compositions have the disadvantage that they necessitate a mixing operation at the time of use. Moreover, especially if the final mixtures thus produced are quick-setting mixtures, the products must be used very quickly.

In order to obviate these disadvantages, there have been proposed so-called self-vulcanising products, which means that it is sufficient for the user to apply the products in question without any prior mixing or other operation. Such compositions are, for example, described in French Patent No. 1,198,749, applied for on Feb. 6, 1958. They obviously represent a considerable advance, but their use still gives rise to a number of problems. Since they set into the form of an elastic solid under the action of moisture, such as is normally present in the atmospheric air, special precautions must be taken during their preparation and for their storage. Moreover, the setting of these compositions is accompanied by the formation of compounds having an acid reaction, the presence of which may be undesirable for certain applications. Finally, since the solidification of these compounds is dependent upon the presence of water, solidification by simple exposure to a humid atmosphere is more especially applicable in practice to the case of thin coatings.

It is therefore desirable to have available vulcanisable compositions which can be stored without difficulty in standard packing receptacles, which solidify without liberating any product which is likely to be troublesome to the users or to the equipment, and which do not require the action of the moisture of the atmosphere or of any other external agent.

The new compounds are polyhydroxylated diorganopolysiloxanes, which are stable in storage and which can be converted into elastic solids under suitable conditions. These new compounds have the following formula:

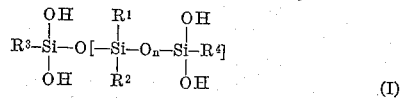
(I)

in which $R^1$, $R^2$, $R^3$ and $R^4$ represent monovalent hydrocarbon radicals, optionally substituted by halogen atoms, and $n$ represents an integer at least equal to 20.

In use they may be mixed with an organic diluent and, where required, fillers and coloured pigments.

The polyhydroxylated diorganopolysiloxanes of Formula I may, according to the invention, be prepared in various ways, more especially by hydrolysis of siloxane compounds of the formula:

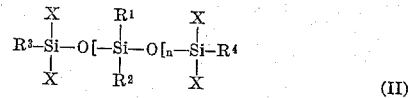
(II)

in which the symbols X represent identical or different hydrolysable groups and the other symbols are as previously defined. In practice this hydrolysis is carried out by the action of water on a compound of Formula II, in which X represents a halogen atom or an acyloxy radical of the carboxylic type, i.e. derived from an organic carboxylic acid. For this operation, the compound of Formula II is diluted with an organic diluent which is inert under the operating conditions and, in order that the acids liberated by this hydrolysis may not cause condensation of the hydroxylated compounds formed, the operation is generally carried out in the presence of an acid-neutralising agent.

As diluent for the compound of Formula II, there may be used hydrocarbons or halogenated hydrocarbons of the benzene series, such as benzene, toluene, xylene or monochlorobenzene; aliphatic hydrocarbons and halogenated derivatives, such as trichloroethylene and tetrachloroethylene; or white spirit, petroleum ethers or ethers, especially aliphatic ethers, such as ethyl ether, propyl ethers and butyl ethers. A single solvent of one particular type may be employed or a mixture of solvents of the same or different types.

As neutralising agents, inorganic or organic products may be used which react with the liberated acids but are inert to the organopolysiloxane compounds involved in the process. There may, therefore, be employed inorganic products such as calcium carbonate or magnesia, but tertiary amines are preferable, and more especially trialkylamines in which the alkyl radicals have from 1 to 4 carbon atoms, such as triethylamine, tripropylamines and tributylamines, the corresponding hydroxylated trialkylamines, such as triethanolamine, heterocyclic tertiary amines, such as pyridine, and various alkyl derivatives, such as the lutidines and picolines.

The neutralising agent is employed in a quantity corresponding with the quantity of acid liberated or in a slight excess. The quantity of organic diluent must be sufficient to fluidise sufficiently the organopolysiloxane compound to be hydrolysed and thus facilitate the operation. With regard to the quantity of water, it must be distinctly greater than the quantity required for complete hydrolysis of the groups X. In practice, the quantity of water employed is such that the hydrolysis is very rapid. A proportion at least equal to one volume of water to 4 volumes of solution of product II is generally suitable.

The hydrolysis temperature may vary within fairly wide limits, for example from 0° to 50° C. Temperature between 15° and 25° C. are particularly useful.

The compounds of Formula II may themselves be prepared by the reaction of an organotrihalosilane, preferably an organotrichlorosilane, or of an organotriacyloxysilane, which substances may be denoted by the formula:

$$R'SiX_3$$

where R' represents either $R^3$ or $R^4$, with a linear diorganopolysiloxane of the formula:

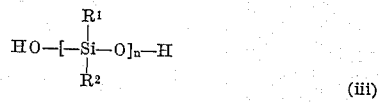
(iii)

in which the symbols have the meanings previously given. A slight excess of the compound $R'SiX_3$ in relation to the compound of Formula III is preferably employed. The reaction is carried out in an inert, anhydrous organic diluent in the presence of a neutralising agent for the acids liberated in the course of the condensation. The previously mentioned diluents and neutralising agents are also suitable in this phase of the process. The operating conditions may also be the same as those given above. It is unnecessary to isolate the compounds of Formula II obtained in order to hydrolyse them. One method of carrying out the process according to the invention therefore consists in diluting a diorganopolysiloxane of Formula III in one of the aforesaid organic diluents, adding a quantity of neutralising agent corresponding to the total quantity of acid which will be liberated in the various phases of the preparation of the compounds (II) and (I) or a slightly larger quantity, adding the quantity of organotrihalosilane or organotriacyloxysilane corresponding to the quantity of hydroxyl groups present in the diorganopolysiloxane III employed and then hydrolysing the product of Formula II thus obtained, separating any solid that may be present, washing with water and then suitably drying the final organic solution.

The preparation of the compounds of Formula III is now well known and need not be recalled in detail here. It is merely to be noted that suitable products may be prepared by heating cyclic diorganopolysiloxanes with sodium or potassium hydroxide.

According to the invention, the groups $R^1$, $R^2$, $R^3$, $R^4$ may each be any monovalent hydrocarbon radical, for example alkyl radicals having from 1 to 4 carbon atoms, alkenyl radicals with a single double bond and containing from 1 to 4 carbon atoms, more especially vinyl and allyl radicals, saturated or monoethylenic cycloaliphatic radicals having 5 or 6 carbon atoms, such as cyclopentyl, cyclohexyl and cyclohexenyl, phenyl radicals and phenyls substituted by lower alkyl groupings such as tolyl, xylyl or cumenyl, phenylalkyl radicals such as benzyl and phenylethyl, and certain halogenated radicals corresponding to the above hydrocarbon radicals, more especially chlorocyclohexyl, chlorophenyl and chlorobenzyl radicals. It is to be understood that the compounds of Formula I may be mixtures of molecules corresponding to different values of $n$, while the meanings of the symbols may vary from one molecule to another. Moreover, the starting diorganopolysiloxanes III may be homopolymers or copolymers comprising different units. The value of $n$ may vary within very wide limits and in practice is at least equal to 20 and may reach numbers of the order to 10,000.

The compounds of formula $R'SiX_3$ employed to produce the radicals $R^3Si(OH)_2—$ and $R^4Si(OH)_2—$ are preferably those in which X represents a chlorine or possibly bromine atom, but organotriacyloxysilanes of the formula $R'Si(OCOR'')_3$ may also be used, in which $R'$ represents $R^3$ or $R^4$ and $R''$ represents a hydrocarbon or halogenated hydrocarbon radical, more especially an alkyl radical such as methyl, ethyl or propyl.

The diluents which may be employed in the compositions according to the invention may be the same as those enumerated above for the preparation of the compounds II and I. To this list there may be added, for particular applications, halogenated or non-halogenated hydrocarbons of low boiling point, such as the butanes and the fluoro and chlorofluoro derivatives of alkanes usually employed for bringing products into aerosol form. These diluents of low boiling point may be employed alone or, more generally, in addition to other diluents.

The compositions according to the invention may consist solely of mixtures of compounds of Formula I with a solvent or a mixture of solvents. For particular purposes, they may also comprise one or more fillers, more especially reinforcing fillers such as silicas resulting from combustion and silica aerogels having large absorbent surface, which themselves may, if desired, be treated by an organosilicon derivative. In addition to these reinforcing fillers, there may be employed fillers such as ground crude silicas, ground quartz, alumina, titanium oxide, calcium carbonate, graphite, carbon black and, in short, any mineral filler which exerts no influence on the storage behaviour of the composition. The proportion of these fillers in relation to the compound of Formula I may vary within fairly wide limits, depending upon the nature of the filler and the applications under consideration.

The stability of the compositions obtained is higher as the compound of Formula I is more dilute and as the storage temperature is lower. The maximum concentration of compound I compatible with long preservation may, for a given temperature of storage, vary slightly in accordance with the particular nature of the organic radicals and the value of $n$. It may also be somewhat influenced by the fillers employed. Generally speaking, for compositions kept at temperatures of the order of 15–25° C. it is recommended that the proportion of compound I should not exceed 80% by weight. In practice, compositions in which the concentration of compounds of Formula I is between 20% and 50% by weight may be stored for several months. With regard to the proportion of liquid diluent, which can generally vary from 20% to 80% in accordance with what has been stated in the foregoing, it is adjusted to within this range mainly in accordance with practical considerations concerning convenience of handling.

The compositions according to the invention may be prepared by simply mixing the constituents, the compound I generally being in the form of the organic solutoin obtained after hydrolysis of compound II. The solvent for the hydrolysis phase, however, may if desired be eliminated and replaced by another solvent.

The solutions of vulcanisable products which are obtained by the process of the invention are suitable for many applications, of which there may be mentioned the sizing or finishing of various substrates, such as paper, glass, wood, metal, etc., the coating of delicate electrical parts, the production of flexible and waterproof films, either supported or unsupported, and the protection of wood or metals from corrosion.

They may be applied by any usual method: spraying, brushing or dipping, if desired after additional dilution at the time of use. The compositions containing a propellent fluid may be applied in the form of aerosols.

Instead of employing the hydroxylated siloxanes of the invention in the dilute state, it is also possible to eliminate the solvent and to use the viscous liquid obtained to fill cavities, to effect various moulding operations and for sealing or jointing. In this case, the solvent is eliminated at the lowest possible temperature so as not to produce excessive thickening of the polyhydroxyorganopolysiloxane.

The solidification of the products may take place at ambient temperature, i.e. at about 15–25° C., as soon as the organic diluent has been eliminated. At this temperature, however, this takes at least 24 hours. Solidification may be accelerated by heating. For a temperature of the order to 150° C. the time taken for solidification is only a few minutes or at most a few hours.

Although the use of vulcanisation accelerators is not essential, such accelerators may, if desired, be added to the compositions according to the invention at the time of their use. For example, a compound such as manganese octoate may be added, which will then cause setting at ambient temperature in a few hours, after evaporation of the solvent.

The following examples illustrate the invention:

*Example 1*

Into an apparatus provided with a stirrer are introduced 150 g. of a dimethylpolysiloxane oil containing 0.1% of hydroxyl radicals (which corresponds to a degree of condensation of 460 atoms of Si), having a viscosity of 16,900 centistokes at 25° C., which is prepared from octamethylcyclotetrasiloxane. 400 cc. of anhydrous toluene are added and a solution having a viscosity of 59 centistokes at 25° C. is obtained.

To this solution are added 6.35 g. of pyridine and 4 g. of methyltrichlorosilane and the whole is stirred for 2 hours.

There are then added to the toluene solution 1000 cc. of ordinary ethylether and 250 cc. of water to effect the hydrolysis of the product obtained in the preceding reaction and of the unreacted methyltrichlorosilane. Stirring is carried on for 30 minutes and then stopped, and the product is allowed to settle: two layers are formed: the lower layer, consisting essentially of an aqueous solution of pyridine and pyridine hydrochloride, is decanted, while the upper ether-toluene layer is washed with water until neutral to bromothymol blue. The ether is thereafter driven off in vacuo at ambient temperature and the product is dried over sodium sulphate and filtered.

There is thus obtained a clear liquid having a viscosity of 58 centistokes at 25° C.

In order to identify the product in solution, a portion of this liquid is extracted and the toluene is driven off therefrom by evaporation at ambient temperature, and the hydroxyl radical content of the residue is determined. The value found is 0.18%, which indicates that the number of hydroxyl radicals has substantially doubled in relation to that of the initial siloxane oil.

This value, combined with the fact that the viscosity of the sloution obtained has remained substantially unchanged, indicates that the following formula can be attributed to the product:

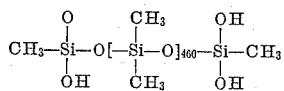

After adjustment of the toluene solution to bring the polysiloxane content to exactly 30% by weight, a sample is extracted for immediate testing and the remainder is kept at ambient temperature (about 20° C.) in a sealed container.

When poured into a glass crystallising dish to a depth of 2 mm. and heated to 150° C., the specimen is converted in 40 minutes into a translucent elastic film which adheres to the support.

The product which has been stored is examined after 6 months. Its appearance has not changed and in applications it behaves in the same way as the product coming straight from the factory.

If the solvent is driven off in vacuo at a temperature not exceeding 30° C. and the liquid obtained is poured into a steel mould to a thickness of 3 cm., there is obtained after 12 hours an elastic solid which has completely set throughout.

*Example 2*

An operation similar to that described in the preceding example is carried out by mixing 150 g. of dimethylpolysiloxane oil similar to that of Example 1, dissolved in 400 cc. of anhydrous toluene, with 5.6 g. of phenyltrichlorosilane and 9.6 g. of pyridine.

The mixture is stirred at ambient temperature for an hour and a half and then poured into 200 cc. of water, still with stirring. At the end of 30 minutes, the upper organic layer is decanted, washed with water, dried over sodium sulphate and filtered.

There is thus obtained a clear solution which, in storage behaves like that of Example 1. When sprayed by means of a gun onto a previously cleaned steel plate, it gives after evaporation of the solvent and heating at 150° C.

for 5 hours, a solid, adherent film (thickness 0.5 mm.), the electrical properties of which are as follows:

Dielectric strength—32 kv./mm.
Transverse resistivity—$5 \times 10^{15}$ Ω cm.

*Example 3*

To 500 g. of a toluene solution containing 30% (by weight) of polyhydroxylated organopolysiloxane prepared as in Example 2 are added 15 g. of silica obtained by combustion (trade name Aerosil). The composition thus obtained behaves in storage as well as those of the preceding examples.

Specimens taken straight from the factory and specimens taken after storage for 6 months were used in the following way: evaporation of the solvent in vacuo at 30° C., casting into a rectangular mould in the form of a layer 0.4 mm. thick, heating at 100° C. for one hour. There is thus obtained in each case a translucent film whose elongation at rupture is greater than 300%.

*Example 4*

Into the same apparatus as that employed in Example 1 are introduced 150 g. of dimethylpolysiloxane oil prepared from octamethylcyclotetrasiloxane, having a viscosity of 106,000 centistokes at 25° C. and 455 cc. of anhydrous butyl ether. There are added to the solution while stirring 6 g. of triethylamine and 2.7 g. of methyltrichlorosilane and stirring is continued for 2 hours at ambient temperature (about 20° C.).

The reaction mass is thereafter diluted with 650 parts of butyl ether, 200 cc. of water are then added and the mixture is stirred for 20 minutes. The organic layer is thereafter decanted, washed and dried as before.

There are thus obtained 745 g. of solution containing 15.8% by weight of organopolysiloxane.

From a test specimen, the solvent was evaporated in vacuo at a temperature below 70° C. to a concentration of 76.5% to give a viscous liquid which is converted at ambient temperature into an elastic, nonsticky material in 5 days. At 150° C. the conversion is obtained in 3 hours.

The remainder of the composition, after storage for 5 months at 20° C. in a closed container, behaves in the same way as the product immediately after manufacture.

Into a specimen of the composition thus kept for 5 months is dipped a glass braid, which is then drained for 30 minutes and thereafter heated for 20 minutes at 150° C. The braid is then covered with a dry, rubbery and adherent film at a rate of 125 g./m.²

On repeating this test, but after the addition of 0.01 g. of dibutyl-tin dilaurate to 100 parts of the composition, heating for 10 minutes at 150° C. is sufficient to form the elastic solid coating.

*Example 5*

150 g. of dimethylpolysiloxane oil identical with that employed in Example 4 are diluted with 220 cc. of anhydrous perchloroethylene. 5.4 g. of triethylamine and 2.7 g. of methyltrichlorosilane are added with stirring, and the stirring is continued for 2 hours at ambient temperature (about 20° C.).

The reaction mass is thereafter diluted with 440 cc. of perchloroethylene, 225 parts of water are added and the mixture is stirred for 20 minutes, whereafter the organic layer is decanted, washed and dried as before.

There is thus obtained a solution containing 12.5 parts of organopolysiloxane to 100 parts of solution.

A specimen of this composition is spread onto metal (aluminum, stainless steel or copper) plates. An adherent transparent film is obtained after heating for one hour at 100° C. and then for 30 minutes at 200° C.

When this experiment is repeated after the addition of 1% of manganese octoate to a specimen of the organopolysiloxane composition, the solid film is formed in 2 hours at 20° C. or in 25 minutes at 150° C. The results are substantially of the same order when using choline octoate as accelerator instead of manganese octoate.

The remainder of the composition containing 12.5% of organopolysiloxane was subjected to a storage test as in the case of the foregoing Examples without any substantial change in properties.

We claim:

1. A storage-stable composition vulcanizable by removal of solvent consisting essentially of a polyhydroxydiorganopolysiloxane having the formula:

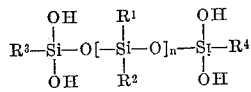

in which $R^1$, $R^2$, $R^3$ and $R^4$ are monovalent radicals selected from the group consisting of hydrocarbon and halogenated hydrocarbon radicals and $n$ is an integer at least equal to 20, and enough of a compatible organic solvent to render the said composition storage-stable.

2. A composition as claimed in claim 1 wherein $R^1$ and $R^2$ are both methyl and $R^3$ and $R^4$ are both phenyl.

3. A composition as claimed in claim 1 wherein $R^1$, $R^2$, $R^3$ and $R^4$ are all methyl.

4. A composition as claimed in claim 1 further comprising a filler.

5. A composition as claimed in claim 1 further comprising a pigment.

6. A composition as claimed in claim 1 wherein the proportion of the organic solvent is 20% to 80% by weight.

7. A storage-stable composition vulcanisable by removal of solvent consisting essentially of a polyhydroxydiorganopolysiloxane having the formula:

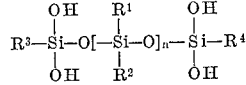

in which $R^1$ and $R^2$ are each alkyl of 1 to 4 carbon atoms, $R^3$ and $R^4$ are each members selected from the group consisting of alkyl of 1 to 4 carbon atoms and phenyl, and $n$ is an integer at least equal to 20, and 20 to 80% by weight of the composition of a compatible organic solvent.

8. Process for the production of a storage-stable composition which consists of the following essential steps (a) reacting, under anhydrous conditions and in the presence of a neutralizing agent for the acid liberated and a compatible organic solvent, a linear diorganopolysiloxane of the formula:

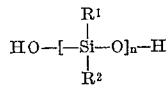

in which $R^1$ and $R^2$ are each selected from the group consisting of hydrocarbon and halogenated hydrocarbon radicals and $n$ is an integer at least equal to 20, with at least two molecular proportions of an organo-silane of the formula:

$$R'SiX_3$$

in which $R'$ is a member selected from the group consisting of hydrocarbon and halogenated hydrocarbon radicals, and each X is a member selected from the group consisting of halogen and carboxylic acyloxy, (b) hydrolyzing the remaining X radicals, (c) separating the organic solvent solution of polyhydroxydiorganopolysiloxane thus produced, and (d) adjusting the concentration of the solution obtained to produce a storage-stable composition.

9. Process according to claim 8 in which the neutralizing agent is a tertiary amine.

10. Process for the production of a storage-stable composition vulcanizable by removal of solvent, which consists of the following essential steps (a) reacting, under anhydrous conditions and in the presence of both enough of a neutralizing agent to neutralize the acid produced in the reaction, and 20 to 80% by weight of a compatible organic solvent, a linear diorganopolysiloxane of the formula:

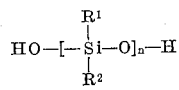

in which $R^1$ and $R^2$ are each alkyl of 1 to 4 carbon atoms and $n$ is an integer at least equal to 20, with at least two molecular proportions of an organo-silane of the formula:

$$R'SiCl_3$$

in which $R'$ is a member selected from the group consisting of phenyl and alkyl of 1 to 4 carbon atoms, and (b) hydrolysing with an excess of water the remaining chlorine atoms, and (c) separating the organic solvent solution of polyhydroxydiorganopolysiloxane thus produced.

11. Process according to claim 10 in which the neutralizing agent is a tertiary amine.

References Cited

UNITED STATES PATENTS

| | | | |
|---|---|---|---|
| 2,501,525 | 3/1950 | Krieble et al. | 260—46.5 |
| 2,646,441 | 7/1953 | Duane | 260—46.5 |
| 2,698,314 | 12/1954 | Rust | 260—46.5 |
| 2,821,518 | 1/1958 | Edelman et al. | 260—46.5 |
| 3,035,016 | 5/1962 | Bruner | 260—46.5 |
| 3,036,035 | 5/1962 | Riley | 260—46.5 |
| 3,094,497 | 6/1963 | Hyde | 260—46.5 |
| 3,122,579 | 2/1964 | Leitheiser | 260—448.2 |
| 3,133,891 | 5/1964 | Ceyzeriat | 260—46.5 |
| 3,146,799 | 9/1964 | Fekete | 260—37 |

FOREIGN PATENTS

| | | |
|---|---|---|
| 602,138 | 7/1960 | Canada. |
| 981,823 | 1/1965 | Great Britain. |
| 1,325,782 | 3/1963 | France. |

LEON J. BERCOVITZ, *Primary Examiner.*

WILLIAM H. SHORT, M. I. MARQUIS,
*Assistant Examiners.*